United States Patent
Weyandt

(10) Patent No.: US 7,520,019 B2
(45) Date of Patent: Apr. 21, 2009

(54) PLEATED FABRIC WASHER/BUFFER ELEMENT, METHOD OF MANUFACTURE AND METHOD OF ATTACHMENT

(75) Inventor: Thomas E. Weyandt, Northville, MI (US)

(73) Assignee: Belanger, Inc., Northville, MI (US)

( * ) Notice: Subject to any disclaimer, the term of this patent is extended or adjusted under 35 U.S.C. 154(b) by 378 days.

(21) Appl. No.: 11/083,276

(22) Filed: Mar. 17, 2005

(65) Prior Publication Data
US 2006/0207047 A1  Sep. 21, 2006

(51) Int. Cl.
B60S 3/06 (2006.01)

(52) U.S. Cl. .............. 15/230.13; 15/230; 15/230.14; 15/53.2

(58) Field of Classification Search .............. 15/230, 15/230.13, 230.14, 230.15, 230.16, 230.19, 15/97.3, 53.2
See application file for complete search history.

(56) References Cited

U.S. PATENT DOCUMENTS

| 2,140,208 | A | * | 12/1938 | Murray | 15/230.1 |
| 2,711,619 | A | * | 6/1955 | Davies | 15/230.14 |
| 2,867,062 | A | * | 1/1959 | Hendrickson | 15/230.14 |
| 2,871,631 | A | * | 2/1959 | Churchill | 15/230.13 |
| 3,849,826 | A | * | 11/1974 | Takeuchi | 15/230.14 |
| 3,991,526 | A | * | 11/1976 | Frank et al. | 451/490 |
| 5,175,900 | A | * | 1/1993 | Hadgis | 15/97.1 |
| 5,380,069 | A | | 1/1995 | Klinkhammer | 300/21 |
| 5,485,653 | A | | 1/1996 | Knowlton et al. | 15/340.4 |
| 5,560,070 | A | | 10/1996 | Reaume | 15/210.1 |
| 5,699,579 | A | * | 12/1997 | Burger | 15/230.14 |
| 6,295,687 | B1 | * | 10/2001 | Dehart | 15/181 |

* cited by examiner

Primary Examiner—Laura C Guidotti
(74) Attorney, Agent, or Firm—Young Basile

(57) ABSTRACT

A car wash brush is constructed using elements of pleated synthetic material. In one form, radially-pleated fabric discs are stacked on a shaft. In another form, a single length of material is laterally pleated and punched to form a continuous pattern of holes along one edge, and assembled onto a spring or flexible cable which can be wrapped around a rotatable drive shaft.

3 Claims, 6 Drawing Sheets

PLEATED FABRIC WASHER/BUFFER ELEMENT, METHOD OF MANUFACTURE AND METHOD OF ATTACHMENT

FIELD OF THE INVENTION

This invention relates to vehicle surface treatment equipment and more particularly to a vehicle buffing and/or washing implement using multiple revolutions of radially-pleated fabric. The invention also includes methods for making and mounting the pleated fabric component.

BACKGROUND

It is well-known to use power-driven rotating implements, typically called "brushes", to wash and/or buff or polish the exterior surfaces of automotive vehicles in an automatic or semi-automatic car wash or polishing facility. Brushes are used to wash or buff the sides and end surfaces of vehicles, as well as horizontal surfaces, windows and wheels.

Brushes are often assembled using long strips of fabric such as synthetic felt; i.e., a non-woven needle-punched material. Such implements, although they perform well as far as the basic washing and/or polishing functions are concerned, are noisy as a result of the slapping action of the rotating strips or strands against the exterior surfaces of the vehicle. Felt strips are also quite limp and do not fill out the full radial profile of a vertical axis brush unless rotated at fairly high speed.

SUMMARY

In one aspect, the present invention is an improved vehicle surface treatment implement; i.e., a brush, for vehicle exterior surface washing, polishing or buffing. In accordance with this aspect of the invention, a surface treatment implement comprises a support shaft or the like and a plurality of revolutions of radially-pleated fabric of at least semi-porous material such as synthetic felt. Because the pleats lend structural strength to the fabric, lighter-weight material may be used. The brush radial profile fills out well at lower speeds of rotation and when stopped.

A further advantage of a vehicle surface treatment implement constructed as described above is that it presents a series of essentially continuous peripheral edges to contact the vehicle as opposed to a moving continuum of individual strips, strands or flaps. Thus, the noise associated with the operation of prior art implements is greatly reduced. This produces a positive perception to persons within the vehicle being treated. The term "substantially continuous" as used herein, refers to an outer peripheral edge which is either circular or helical or which has offset sectors.

In another aspect, the invention comprises the pleated fabric component, in the form of a radially-pleated disc mountable on a shaft with other such discs, or a single longer element which is helically wrapped around a support shaft.

Other aspects and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
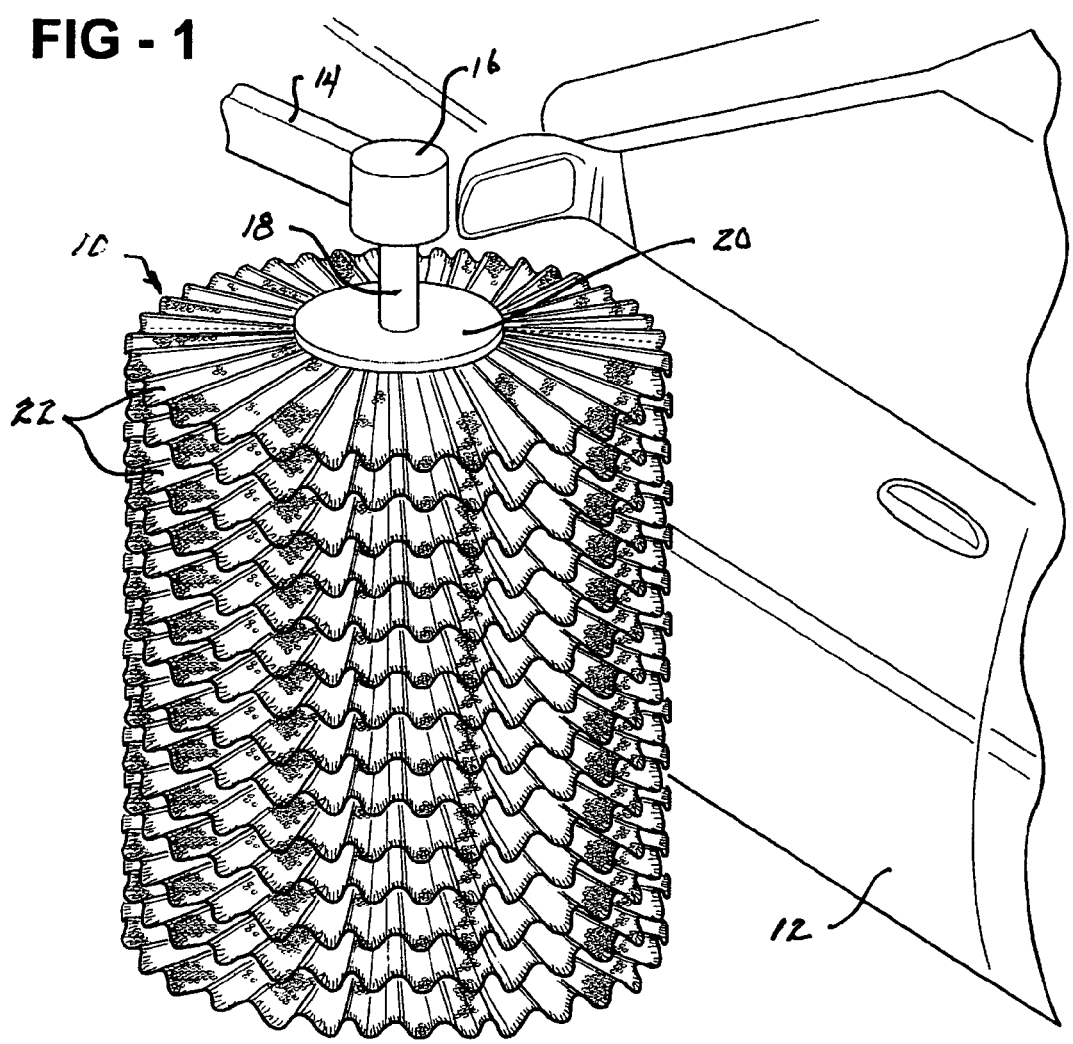
FIG. 1 is a perspective view of a wheel in the form of a side brush constructed in accordance with the present invention and using a plurality of circular radially-pleated elements made and formed in accordance with the present invention.
Figure 2:
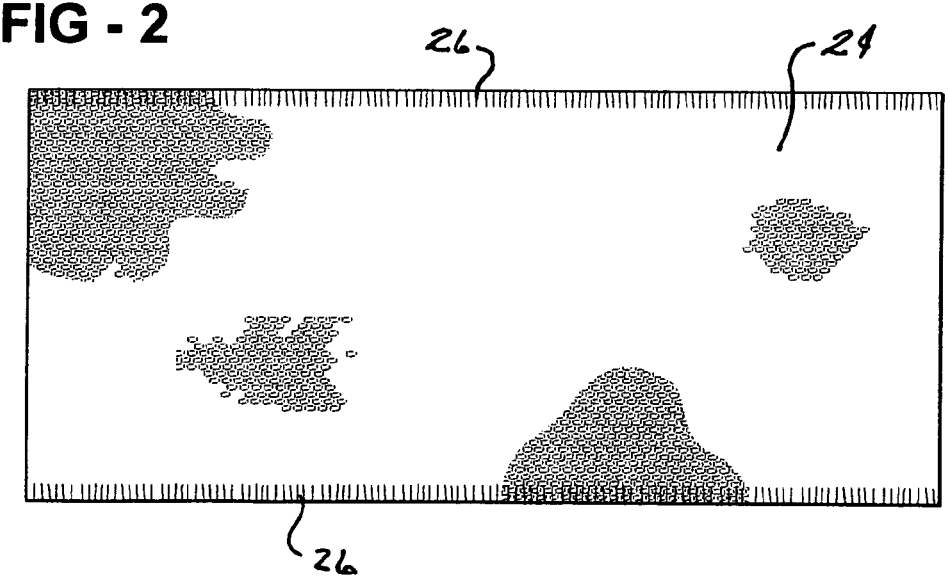
FIG. 2 is a plan view of a rectangular sheet of non-woven, semi-porous synthetic material useful in making an element for the wheel of FIG. 1.
Figure 6:
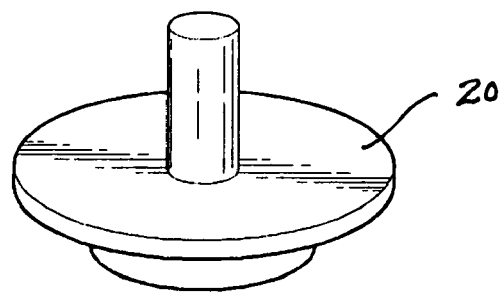
FIG. 6 is a diagrammatic view in perspective of an apparatus which is used to construct the wheel of FIG. 1 using the element made in accordance with the procedures shown in FIGS. 2-5.
Figure 6:
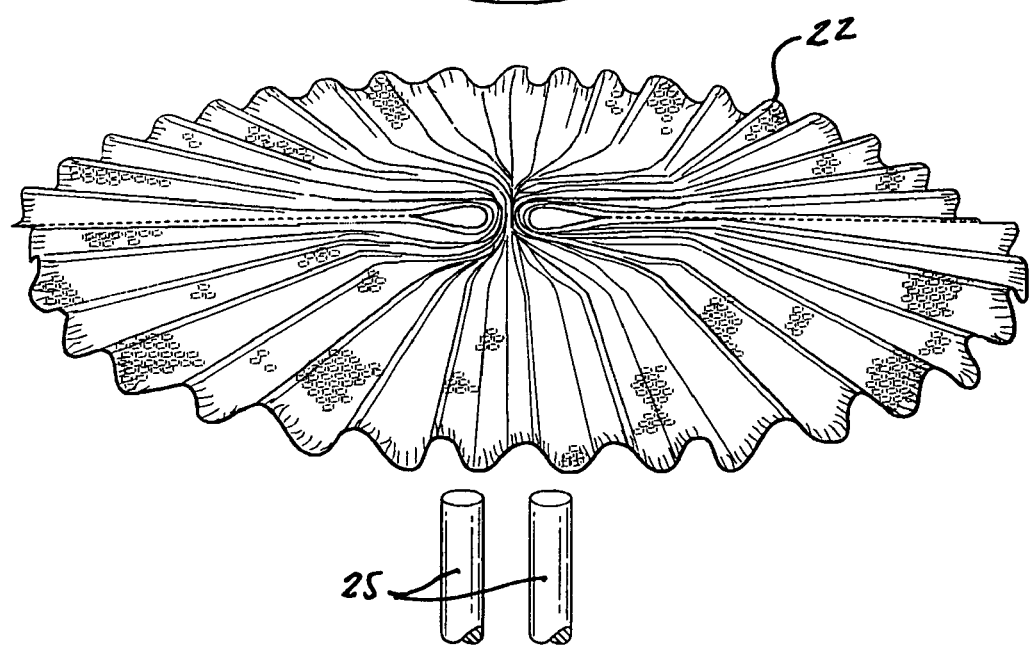

FIG. 1 shows a vehicle surface treatment implement in the form of a car wash side brush 10 in operative engagement with the exterior surface of the door 12 of a vehicle which is located in an automatic car wash system (not shown). The brush 10 is mounted on a pivotal support frame 14 of conventional design, details of which are omitted for brevity. Frame 14 supports an hydraulic motor 16 which rotates the brush shaft 18 about an essentially vertical axis. The axis may also be slanted or tilted in a known manner. The shaft 18 is connected to an adaptor 20 which is further described with reference to FIG. 6. The brush 10 comprises a plurality of radially-pleated, synthetic, non-woven, semi-porous fabric discs 22 which are stacked on support shafts 25 shown in FIG. 6 to produce the desired length. It will be apparent that the illustration of the invention in the form of a vehicle side brush is exemplary only in that the principles involved may also be used to construct and operate shallower window brushes, tire brushes and wide top brushes as well as numerous polishing and buffing devices of various sizes and configurations.

Each of the radially-pleated disc elements 22 is manufactured from a rectangular sheet 24 of a suitable non-woven semi-porous synthetic material. One such material is sold under the trade name BLOCK-IT 200 and is made by Kimberley Clark. This material, although it has the appearance of a resin-backed woven fabric is actually non-woven and weighs about 4.5 ounces per square yard. Another suitable material is needle-punched synthetic felt, preferably of such density and thickness to fall into the 5 to 10 ounces per square yard weight range. Both such materials are semi-porous and will, therefore, absorb and carry some amount of water to enhance a washing action. Heavier material may, of course, be used, but it is most advantageous to use relatively light-weight material; i.e., a material weighing less than about 10 ounces per square yard. To make a 48-inch diameter element, sheet 24 is preferably 95 inches in length along the longer opposite edges and 48 inches in width. The lesser dimension defines the diameter of the assembled brush 10. It will be noted that the longer edges are artificially pre-frayed at 26 by means of a mechanized slitting operation. The slits for fraying purposes are short and close together, e.g., about one inch in depth and spacing. This pre-fraying is optional.

Figure 3:
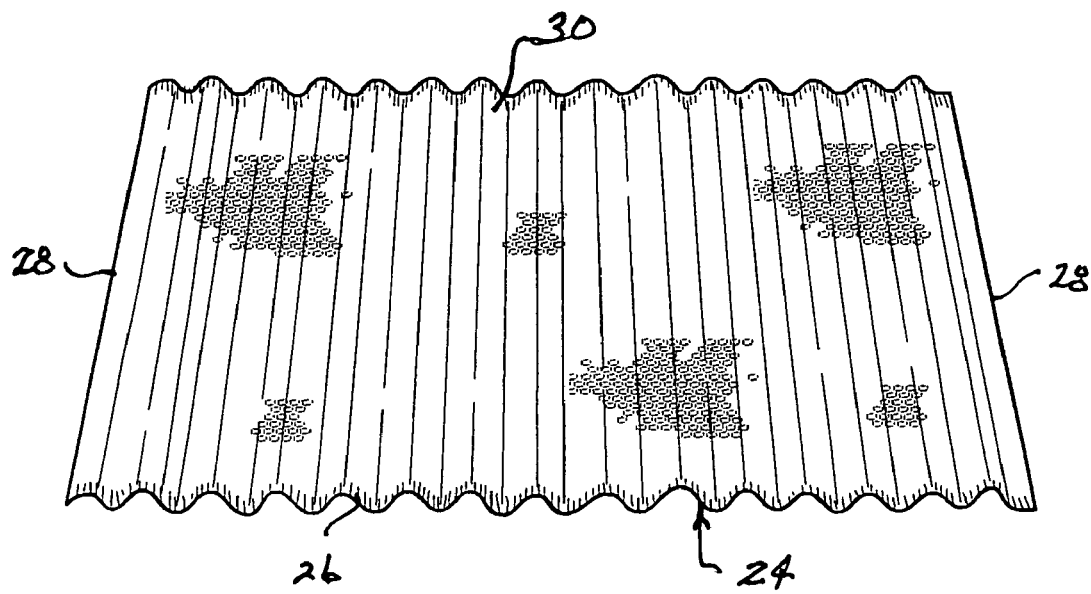
FIG. 3 is a perspective view of the rectangular sheet of FIG. 2 after a first wheel element forming operation has been performed.

Turning now to FIG. 3, the second step of the manufacturing process is to form pleats 30 of approximately 2 inches in width running parallel to the shorter opposite edges 28. Pleating machines can be used for this purpose. The pleats are permanently set in the material by heat and/or pressure.

Figure 4:
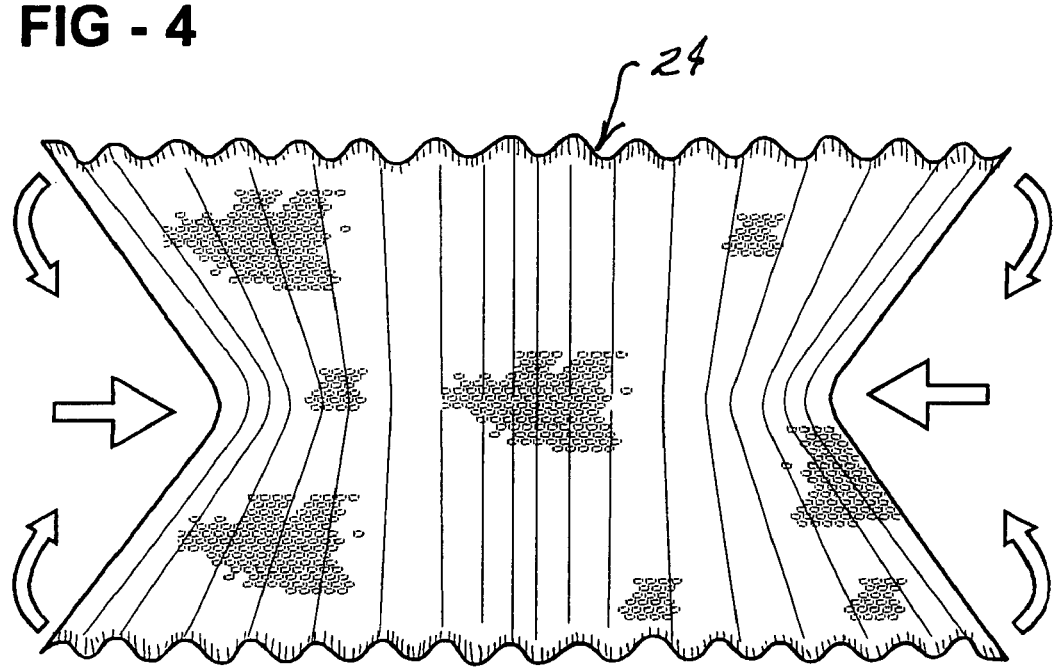
FIG. 4 is a plan view of the sheet element of FIG. 3 showing how a second element forming operation is performed.
Figure 5:
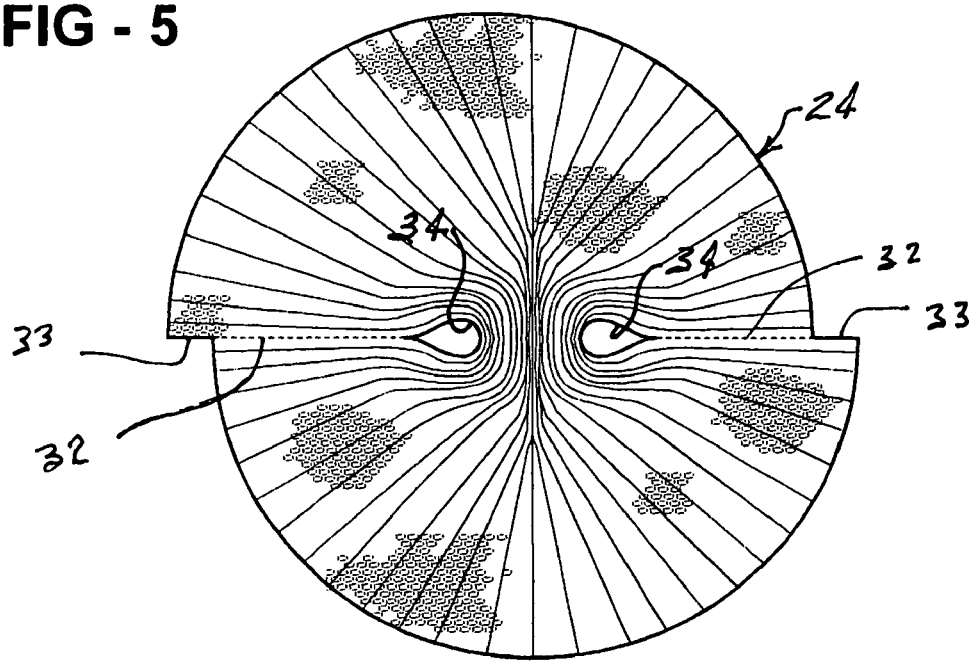
FIG. 5 is a plan view of the elements of FIGS. 2, 3 and 4 after it has been "circularized" and fit to form two radially opposite seams.

Referring now to FIGS. 4 and 5, once the pleats 30 are formed, the next step is to "circularize" the sheet 24 by folding the opposite short edges 28 over on themselves and stitching along the seams 32 as shown in FIG. 5. While the edges 28 are folded onto themselves and joined by the seams 32, they are offset by approximately 1 or 2 inches such that the outer peripheral edge, although substantially continuous, has slight radial discontinuities 33 which have been found to improve the coverage provided by the element 22 when used in a surface treatment implement. The folding and stitching of the edges 28 is such as to define two closely spaced openings 34 which are used for mounting the discs 22 on shafts 25 as hereinafter described. Looking to FIG. 6, the finished wheel element 22 is mounted on a pair of parallel support shafts 25 by passing the shafts through respective openings 34. A sufficient number of elements 22 are stacked on the shafts 25 to provide the desired longitudinal dimension. Typically, it has been found that the thickness and density of the material of the element 22 is enough that no spacer or intervening elements on the shaft 25 are required. However, spacers may be used where desired. The assembly is completed by inserting the ends of the shafts 25 into correspondingly sized and located sockets in the adaptor 20 to essentially convert the double shafts to a single shaft which is driven by motor 16. Set screws are preferably used to join the adaptors 20 to the shafts because this will permit the assembly to be taken apart for the purpose of replacing individual radially-pleated elements 22 as needed. The double shaft arrangements prevent the disc elements 22 from rotating on the shafts 25 when the shafts 25 are driven in rotation.

Figure 7:
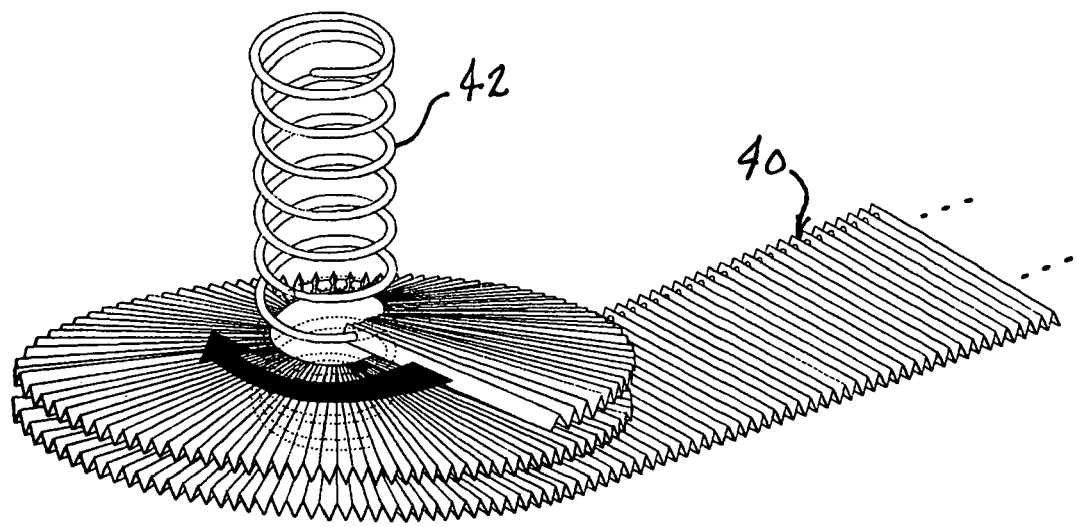
FIG. 7 is a perspective view of a second embodiment of the invention in an early stage of assembly.
Figure 8:
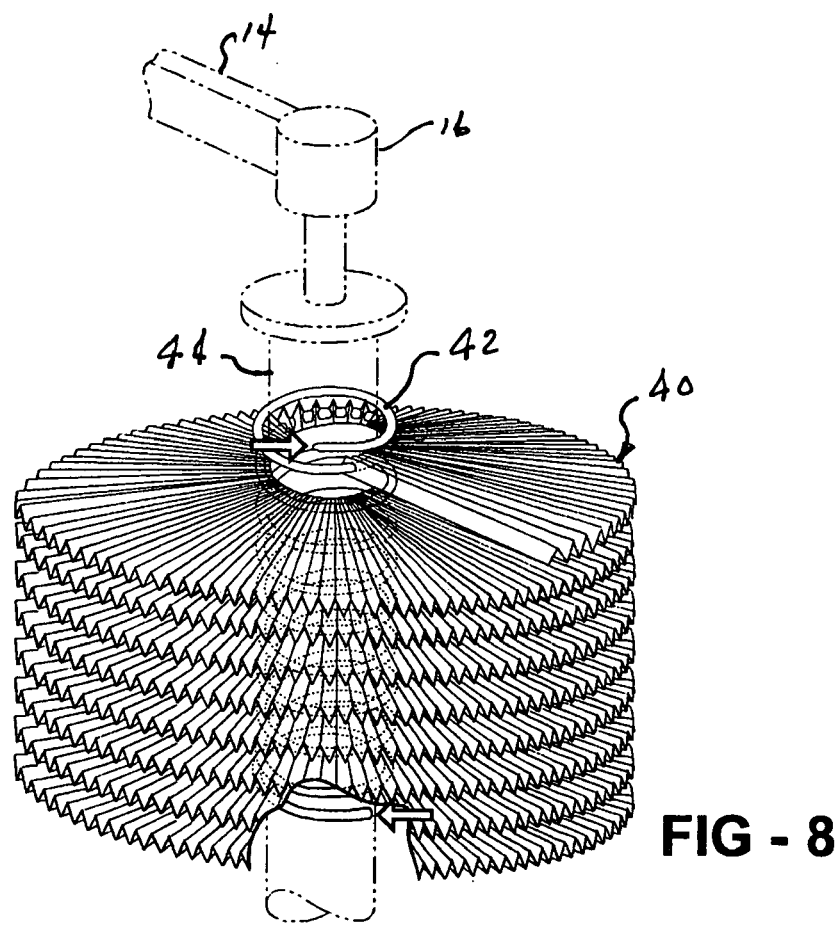
FIG. 8 is a perspective view of the FIG. 7 embodiment in a later stage of assembly.

Referring to FIGS. 7 and 8, a second embodiment of the invention is shown to comprise a single pleated fabric element 40 which is shown in the process of being assembled to a helical spring 42 adapted to be mounted on a large diameter shaft 44 attached to the drive motor 16 carried by support frame 14. Whereas the brush 10 of FIG. 1 is constructed from a plurality of pleated discs 22, the brush of FIG. 7 and 8 is constructed from a single length of material, the width of which is equal to the desired radius of the finished brush and the length of which is determined from the formula:

$$\Pi \times (2 \times \text{brush radius}) \times (\text{the number of desired revolutions}).$$

The pitch between the revolutions, along with the number of revolutions, will determine the brush length. A brush with 10 revolutions may require a fabric strip on the order of 90 feet. However, since the material is typically made in a continuous fashion and can be purchased in rolls of 100 feet or more, a pleated strip of approximately 90 feet in length poses no significant manufacturing problem. In addition, shorter lengths of material can be joined together by sewing or the like to create the desired length. Again, the material is fed through a pleating machine to produce laterally extending 2 or 3 inch pleats which are set by heat and pressure. Thereafter, holes are punched through the pleated material near one edge so as to permit the length of pleated material to be fed onto the coils of the helical springs 42. The material is loaded onto the spring until the entire spring has been filled out. The material specification is as given above for the embodiment of FIG. 1.

At this point, it should be noted that the relaxed inside diameter of the helical spring 42 is slightly less than the outside diameter of the shaft 44. Therefore, to assemble the spring 42 to the shaft 44, the spring 42 is flexed in a direction tending to open or expand the inside diameter of the spring such that the spring, along with the pleated fabric element 40, is easily slipped over the shaft 44. With the spring 42 in the proper position, the spring 42 is relaxed so as to grip the shaft 44 and hold the entire assembly in position. Small retainers can be fitted over the ends of the spring 42 and screwed into the shaft 44 to hold the assembly in place if desired.

The single sheet element 40 provides essentially the same advantages of the multiple element of the brush 10 of FIG. 1; i.e., the pleated fabric has good structural strength and fills out the profile of the brush, even when not in motion. In addition, the scrubbing and/or buffing action provided by the pleated fabric edges is quiet and effective in both washing and polishing operations.

Figure 9:
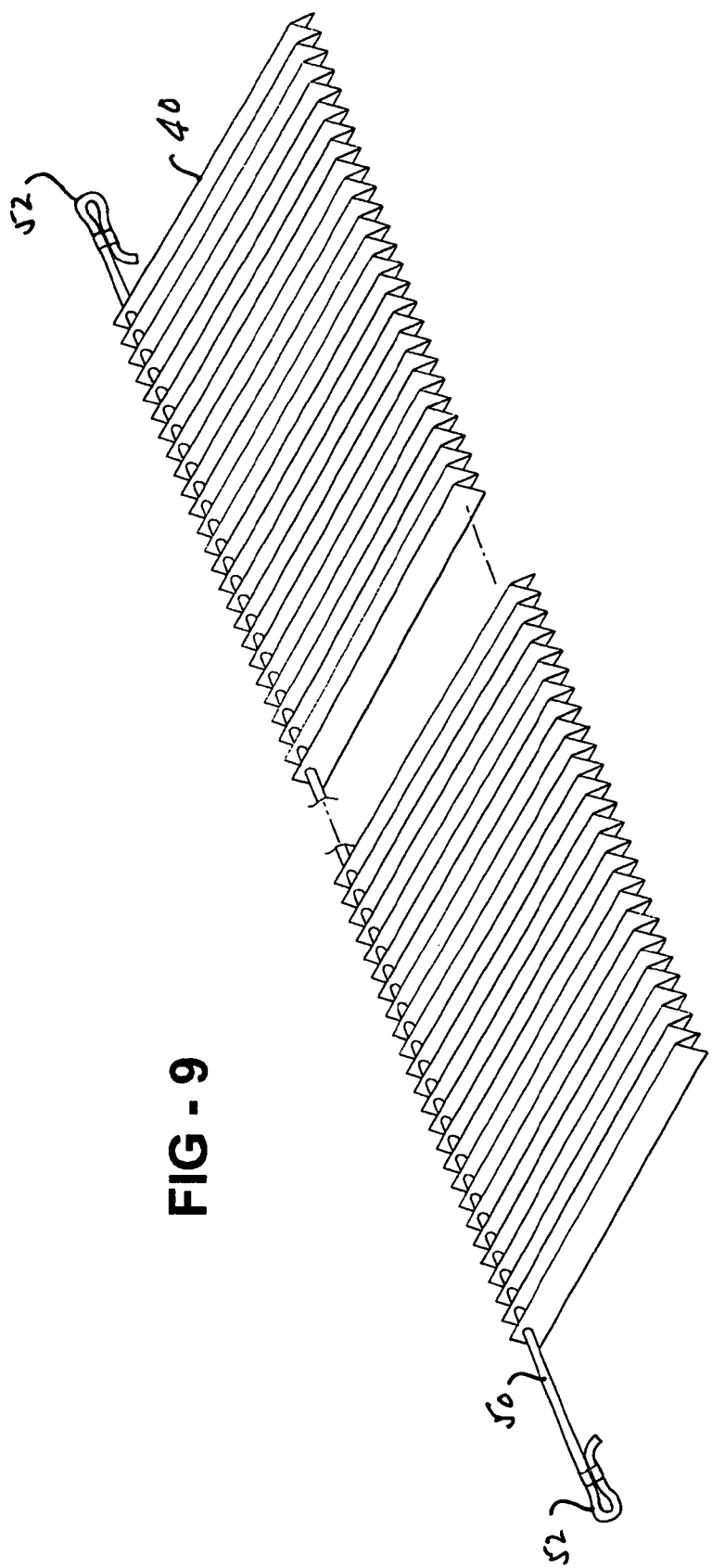
FIG. 9 is a perspective view of a still further embodiment of the invention in which a single sheet of material is loaded onto a flexible cable.
Figure 10:
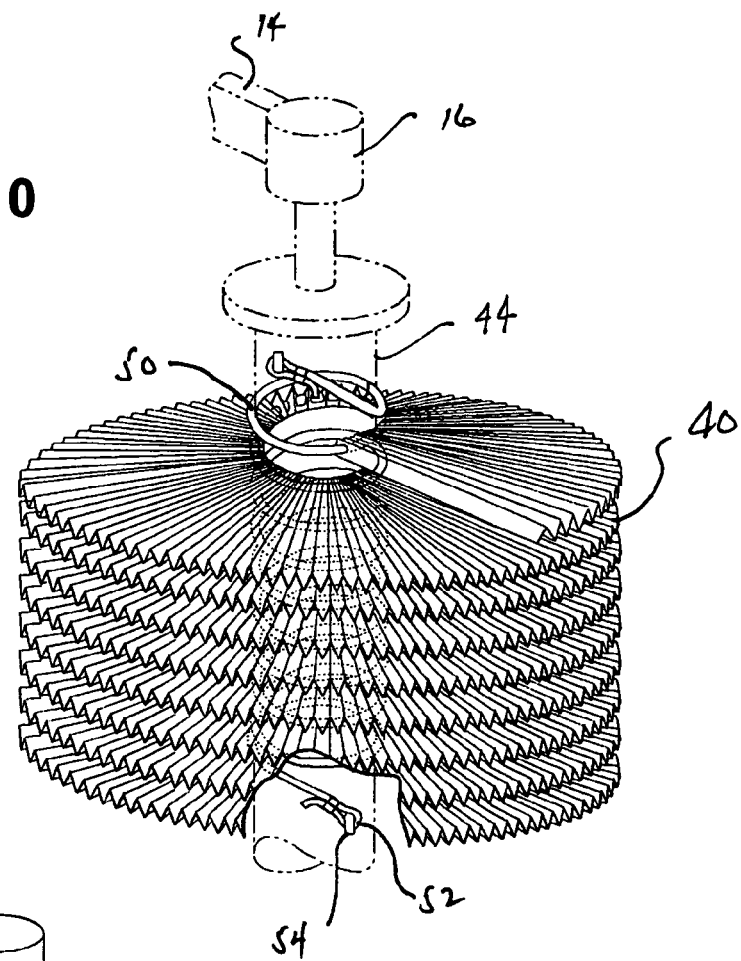
FIG. 10 is a perspective view of the structure of FIG. 9 assembled to a support shaft.

Referring now to FIGS. 9 and 10, a still further embodiment of the invention is shown to comprise a long-length pleated fabric element 40 which is identical to the element 40 shown in FIGS. 7 and 8; i.e., it is of the same length and width and has a continuous set of holes punched or otherwise formed through the pleats near one edge as shown. Using these holes, the element 40 is then fed onto a flexible cable 50 which, after assembly, is turned over and secured at the opposite ends to form eyes 52.

As shown in FIG. 10, the cable 50, with the pleated elements 40 assembled thereto, is wrapped around a large diameter support shaft 44 mounted to a frame 14 having a drive motor 16 in the conventional fashion. The eyes 52 are secured by retainers 54 which are screwed or otherwise assembled into the shaft 44.

Figure 11:
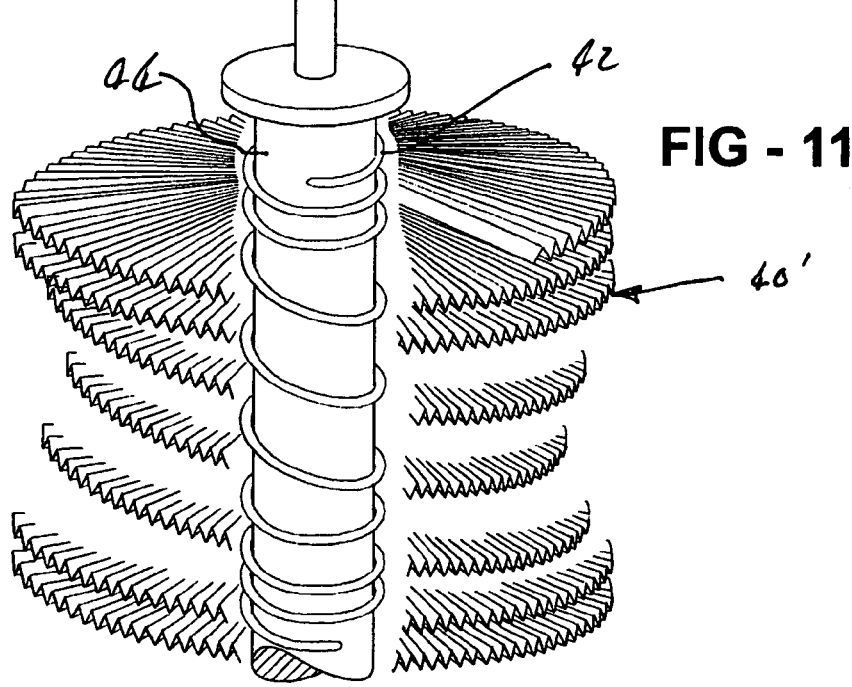
FIG. 11 is a perspective view of a still further embodiment of the invention in the form of an hourglass shaped brush.

Referring now to FIG. 11, a variation of the embodiments of FIGS. 7 and 8 is shown. In this embodiment, the pleated fabric brush element 40' has been cut prior to assembly to produce an hourglass shape in the final brush. It has been found that this shape is particularly useful in contacting contoured surfaces such as vehicle doors or roofs. Although a concave shape is shown, various other shapes including convex and undulating shapes are possible.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A rotary carwashing brush comprising:
   an elongate, rotatable support structure defining an axis of rotation;
   brush means mounted on such structure for rotation therewith about said axis and having an outer perimeter;
   said brush means comprising multiple axially spaced-apart, circumferentially continuous revolutions of a non-woven, water-carrying, synthetic material into which shallow regularly alternating pleats of approximately two inches in width have been preformed and permanently set by heat and pressure; the pre-pleated construction of said revolutions being such that the pleats extend radially of said axis substantially fully from said axis to said outer perimeter and provide sufficient body to said brush means to remain substantially radially extended when stationary; and means for rotating said support structure and brush means against the wet surface of a vehicle being washed.

2. The rotary carwashing brush defined in claim 1 wherein the radially outermost, circumferential edges of the revolutions are pre-frayed.

3. The rotary carwashing brush defined in claim 1 wherein the synthetic material is needle-punched synthetic felt.

* * * * *